United States Patent Office 3,585,024
Patented June 15, 1971

3,585,024
UPGRADING THE TANTALUM AND COLUMBIUM CONTENTS OF TIN SLAGS
John A. Cenerazzo, Reading, Charles E. Mosheim, Zionsville, and Corrado E. Marvasi, Philadelphia, Pa., assignors to Kawecki Berylco Industries, Inc., New York, N.Y.
No Drawing. Filed Dec. 5, 1968, Ser. No. 781,605
Int. Cl. C21b *3/04;* C22b *3/00, 51/00*
U.S. Cl. 75—24         5 Claims

ABSTRACT OF THE DISCLOSURE

The tantalum and columbium components to tin slags are upgraded by first smelting the slag with carbon to convert these components to their respective carbides, solubilizing the iron, calcium, silicon and other diluent components of the carburized slag with a hot aqueous mixture of hydrochloric and hydrofluoric acids, and separating and calcining the residual tantalum and columbium carbides to their respective oxides free from a major proportion of each of the indigenous diluent components of the slag.

---

This invention relates to the upgrading of the tantalum and columbium components of tin slags containing these components along with iron, calcium, silicon, aluminum, titanium and tungsten, as primary diluents.

Numerous procedures have been proposed and tried heretofore for upgrading the tantalum and columbium components of tin slags, but in general these procedures have been characterized by poor recoveries of tantalum and columbium and have been plagued by difficulties in critical filtering operations which impeded commercial scale operation.

We have now devised a commercially feasible method of upgrading tin slags characterized by significantly higher tantalum and columbium recoveries than attainable heretofore. Pursuant to the present invention, the tantalum and columbium components of a tin slag are first converted to their respective carbides by smelting the slag with carbon, comminuting the resulting carbide-containing product of the smelting operation to at least 50% minus 325 mesh, admixing the comminuted carbide product with an aqueous solution of hydrochloric acid and hydrofluoric acid, the hydrochloric acid content of the solution being substantially in excess of that stoichiometrically required to combine with the iron, calcium, aluminum, titanium and tungsten components of the carbide product and the hydrofluoric acid content being substantially that stoichiometrically required to combine with the silicon component of the carbide product and of an initial concentration within the range of about 2 to 5.5% HF by weight, heating the carbide product in said mixed acid solution for a period of time sufficient to solubilize the iron, calcium and silicon components of the slag, separating the solid residue of the acid treatment containing the tantalum and columbium carbides from the acid-solubilized aqueous phase, and calcining the separated residue in air at a temperature within the range of about 600°–900° C. for a sufficient period of time to convert its tantalum and columbium carbides to their respective oxides.

The following approximate composition is that of a typical Maylaysian tin slag:

|  | Percent |  | Percent |
|---|---|---|---|
| $Ta_2O_5$ | 4 | $WO_3$ | 8 |
| $Cb_2O_5$ | 4 | $ZrO_2$ | 3 |
| $Fe_2O_3$ | 11 | $MgO$ | .5 |
| $SiO_2$ | 21 | $MnO_2$ | .5 |
| $CaO$ | 25 | $SnO$ | .5 |
| $TiO_2$ | 11 | $V_2O_5$ | .5 |
| $Al_2O_3$ | 9 |  |  |

Tantalum- and columbium-bearing tin slags of this composition and other tin slags, as well as other tantalum- and columbium-containing metallurgical by-products, are all amenable to the benefication method of our invention.

The first stage of this benefication comprises a carbon reduction of at least the tantalum, columbium and iron components of the slag. Although this can be done by mixing the ground slag with powdered anthracite, pelletizing the mixture and then heating the mixture in a kiln, we presently prefer to effect the carbon reduction by smelting in an electric arc furnace. The ground slag to be smelted, together with sufficient carbon to reduce the iron and to carburize the tantalum and columbium components of the slag, is charged to a tilting electric arc furnace and is smelted to form a hearth product and a supernatant slag. The slag product, comprising much of the lime, silica, titania, alumina and magnesia of the tin slag charge, is poured out of the furnace at temperatures of about 1300°–1700° C. Pouring is stopped when the hearth product approaches the pouring lip. This hearth product, comprising principally the tantalum, columbium and iron predominately in the form of a high-carbon ferro alloy containing the tantalum and columbium in the form of their carbides, is raked out of the furnace while at a temperature of about 1400–1800° C. The furnace slag product is discarded, and the hearth product is crushed to prepare it for subsequent treatment. The crushed product is advantageously but not necessarily further upgraded by passing it over a magnetic pulley, in which case the non-magnetic fraction is preferably returned to the smelting operation. The hearth product at this stage is referred to hereinafter as the "carbided tin slag."

The carbided tin slag would normally be ground to about minus 8 mesh (Tyler Standard) to effect physical separation of the carbides from non-carbide components. In the present method, however, the carbided tin slag must be comminuted, by crushing or grinding or both, to at least 50% minus 325 mesh and a maximum of 10% plus 100 mesh. Still further and finer comminution is advantageous because the finer the particle size the more complete the separation of diluents from the tantalum and columbium made possible by the practice of our method.

The ground carbided tin slag product is then admixed with an aqueous mixture of hydrochloric and hydrofluoric acids at a rate slow enough to prevent physical loss of reactants by the foaming which accompanies the initial reaction. The order in which one component or another is added or combined appears to be completely unimportant, the only requirement being that the carbided tin slag be slurried with the combined acids in a certain concentration and amount. Of these, the hydrofluoric acid concentration is determinative. Thus, for the practice of the invention, we have found that the HF concentration must be at least 2% by weight of the aqueous acid solution to effect solubilization of the silicon component of the carbided tin slag. We have also found that the HF concentration is increasingly more effective up to about 5% but that higher HF concentrations, beginning between 5.5 and 6%, cause the $SiF_4$ vapor liberated from $H_2SiF_6$ in the solution to decompose by hydrolysis in contact with water vapor and thus form silica which deposits on and fouls the equipment above and downstream from the aqueous reaction mass. Accordingly, the HF concentration is preferably limited to about 2 to 5.5% by weight in the carbide-treating acid solution, although it can be added initially in the form of any concentration, say as 70% HF solution.

The total amount of hydrofluoric acid used in making up the mixed acid solution is advantageously at least that stoichiometrically equivalent to the silicon content of the carbided tin slag. However, a large excess of HF appears to have no beneficial effect, and of course a deficient amount of HF is inefficient. Accordingly, for a representative carbided tin slag containing about 6.5% by weight of silicon, we presently prefer to use about 0.4 to 0.5 ml. of 70% hydrofluoric acid per gram of the slag.

The amount of hydrochloric acid used in the mixed acid solution is determined by the amount of iron, calcium, aluminum, titanium and tungsten in the carbided tin slag and should be substantially in excess of that amount stoichiometrically equivalent to these components. Where about 2.0 to 2.5 ml. of 37% hydrchloric acid per gram of carbided tin slag is such an equivalent amount of acid, a lesser amount is inefficient and a greater amount of acid is wasteful because it is not significantly more effective. While the concentration of the hydrochloric acid added to the mix is of no importance, we have found that the HCl concentration in the mixed acid treating solution should not exceed about 20% by weight. HCl concentrations above about 20% tend to produce a progressively more gelatinous reaction product.

The aforementioned mixed acid solution will effect the desired dissolution of the iron, calcium, silicon and aluminum components of the carbided tin slag, as well as a significant portion of its tungsten and titanium components, by heating the slag-acid mixture to about 100° C. for a period of about 3 to 4 hours, advantageously while maintaining agitation of the mixture. Lower temperatures than 100° C. require excessively long reaction times, and shorter reaction times than 3 hours, even at 100° C., give inadequate dissolution of the leachable components.

After dissolution of the iron, calcium, silicon and aluminum has been completed, along with partial dissolution of the tungsten and titanium, the resulting residue of the leached carbided tin slag is separated by filtering in any conventional manner. To complete the separation, the carbide filter cake should be washed with water, either in situ on the filter or preferably by repulping the filter cake in wash water. For washing purposes, we have found that about 1 ml. of water per gram of the carbided tin slag is sufficient to effect the desired separation and that the use of even ten times this amount of water is not significantly better in terms of overall efficiency of the upgrading operation.

The leached and washed carbided tin slag residue is then ready to be converted to oxide. This requires removal of residual wash water and calcination in air. While these steps can be carried out separately, the economics of large scale operation favor the carrying out of both steps in a single heating operation. Accordingly, the leached and washed residue is charged to a calcination furnace where, during the heating of the charge to calcination temperature, the entrained water is removed. Calcination temperature between 600° and 900° C. have been found to be effective, temperatures below 600° C. being inadequate to effect thorough oxidation of the residue and temperatures above about 900° C. causing the oxide to crystallize in a form refractory to subsequent digestion of the oxide in conventional operations for solubilization, separation and recovery of the tantalum and columbium components. Within the aforementioned range, lower temperatures require longer calcination times. At a calcination temperature of about 800° C., which is presently preferred, conversion of the residue's carbides to oxides is substantially completed in 2 hours at temperature.

The following specific example is illustrative but not limitative of the method of our invention:

A charge of tin slag was admixed with carbon and smelted in an electric arc furnace. The tin slag had the following composition: 4% $Ta_2O_5$, 4% $Cb_2O_5$, 11% FeO, 21% $SiO_2$ and 25% CaO, plus lesser amounts of other components, and the carbon supply comprised coke crushed to ¼ inch and smaller, the slag to carbon ratio being about 8:1.1 by weight. Upon completion of smelting, the furnace skull product, remaining after pouring off the top layer of slagged constituents, had the following analysis:

|  | Percent |
|---|---|
| TaC (as $Ta_2O_5$) | 10.9 |
| CbC (as $Cb_2O_5$) | 11.7 |
| Fe (as Fe) | 20.3 |
| Ca (as Ca) | 8.3 |
| Si (as Si) | 6.4 |
| Ti (as Ti) | 7.2 |
| W (as W) | 5.5 |
| Al (as Al) | 4.5 |

The carbide product was ground to about 50% minus 325 mesh and a maximum of about 7% plus 100 mesh. On the basis of one kg. of this carbided tin slag, there was formed a mixed acid solution composed of 2 liters of 37% hydrochloric acid, 0.5 liter of 70% hydrofluoric acid and 8.13 liters of water. The resulting aqueous solution contained approximately 4% HF and 8% HCl, by weight. The ground carbided tin slag was added slowly to the acid while the evolved hydrogen produced a foam in the acid mixture, the amount of foaming being the only limitation on the rate of addition of the carbide. When all of the carbided tin slag had been combined with the mixed acid solution, the resulting slurry was stirred while being heated to and maintained at 100° C. under refluxing conditions for 4 hours. The reaction product was then filtered and the filter cake was re-slurried with one liter of wash water per kilogram of carbided tin slag. After re-filtering, the filter cake was charged to a calcining furnace. At this stage, the charged cake contained 30% by weight columbium carbide (expressed as $Cb_2O_5$) and 28% tantalum carbide (expressed as $Ta_2O_5$), representing a 98.1% recovery of the tantalum component and a 98.4% recovery of the columbium component of the carbided tin slag. The cake further contained only 12.5% of its original iron content and 1% of each of its original calcium, silicon and aluminum contents of the carbided tin slag. The titanium and tungsten components were also lowered from their original levels. The charge was heated in the calcining furnace to a temperature of about 800° C. and was held at this temperature in an air atmosphere for 2 hours.

The calcined product contained less than 1% carbon and had virtually all of it tantalum and columbium components in the form of oxides readily soluble in hydrofluoric acid under the conditions normally used for solubilizing the tantalum and columbium contents of tantalite and columbite ores. In its calcined form, this ungraded tin slag product was completely amenable to conventional treatment for separate and efficient recovery of its tantalum and columbium contents.

We claim:
1. The method of upgrading the tantalum and columbium content of a tin slag containing these components along with indigenous iron, calcium, silicon and aluminum which comprises first smelting the slag with carbon to convert the tantalum ad columbium components to their respective carbides, comminuting the carbide-containing product of the smelting operation to at least 50% minus 325 mesh, admixing the comminuted carbide product with an aqueous solution of hydrochloric and hydrofluoric acids, the hydrchloric acid content of the solution being substantially in excess of that stoichiometrically required to combine with the iron, calcium, aluminum, titanium and tungsten components of the carbide product and the hydrofluoric acid content being at least that stoichiometrically required to combine with the silicon component of the carbide product and of an initial concentration within the range of about 2 to 5.5% HF by weight, heating the carbide product in said mixed acid solution for a period of time sufficient to solubilize the iron, cal- cium and silicon components of the carbide product, separating the solid residue of the acid treatment containing the tantalum and columbium carbides from the acid-solubilized aqueous phase, and calcining the separated carbide residue in air at a temperature within the range of about 600–900° C. for a sufficient period of time to convert its tantalum and columbium carbides to their respective oxides.

2. The method according to claim 1 in which the carbide-containing product of the smelting operation is comminuted to a maximum of 10% plus 100 mesh.

3. The method according to claim 1 in which the hydrochloric acid concentration in the mixed acid solution does not exceed about 20% by weight.

4. The method according to claim 1 in which the mixture of the carbide product and the mixed acid solution is heated to about 100° C. for at least about 3 hours.

5. The method according to claim 1 in which the calcination of the separated carbide residue is carried out at a temperature of about 800° C. for a period of about 2 hours.

References Cited

UNITED STATES PATENTS

| | | | |
|---|---|---|---|
| 2,950,966 | 8/1960 | Foos | 75—101 |
| 2,953,453 | 9/1960 | Foos | 75—101 |
| 3,300,297 | 1/1967 | Fields | 75—24 |
| 3,314,867 | 4/1967 | Gore | 204—32 |
| 3,447,894 | 6/1969 | Gustison | 75—24 |

ALLEN B. CURTIS, Primary Examiner

P. D. ROSENBERG, Assistant Examiner

U.S. Cl. X.R.

75—62, 97, 111

UNITED STATES PATENT OFFICE
CERTIFICATE OF CORRECTION

Patent No. 3,585,024     Dated June 15, 1971

Inventor(s) JOHN A. CENERAZZO et al

It is certified that error appears in the above-identified patent and that said Letters Patent are hereby corrected as shown below:

Column 1, line 14, before "tin" change "to" to --of--.

Column 2, line 8, "benefication" should be --beneficiation--;

line 9, "benefication" should be --beneficiation--.

Column 4, line 52, "ungraded" should read --upgraded--;

line 61 "ad" should read --and--; and line 66, "hydrchloric" should be --hydrochloric--.

Signed and sealed this 2nd day of November 1971.

(SEAL)
Attest:

EDWARD M. FLETCHER, JR.    ROBERT GOTTSCHALK
Attesting Officer     Acting Commissioner of Patents